United States Patent
Fukumoto et al.

(10) Patent No.: US 6,955,628 B2
(45) Date of Patent: Oct. 18, 2005

(54) CHANGE-SPEED SYSTEM FOR UTILITY VEHICLE

(75) Inventors: Toshiya Fukumoto, Sakai (JP); Norifumi Adachi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/656,891

(22) Filed: Sep. 5, 2003

(65) Prior Publication Data

US 2004/0127328 A1 Jul. 1, 2004

(30) Foreign Application Priority Data

Dec. 6, 2002 (JP) ........................................ 2002-355758

(51) Int. Cl.[7] ........................... B60K 41/28; B60K 41/02
(52) U.S. Cl. ........................... 477/70; 477/174; 477/180
(58) Field of Search ........................... 477/70, 168, 174, 477/180

(56) References Cited

U.S. PATENT DOCUMENTS 5,806,640 A * 9/1998 Kale ........................ 192/12 C
6,112,870 A     9/2000 Fukumoto
6,692,409 B2 * 2/2004 Fukumoto et al. ........... 477/174

FOREIGN PATENT DOCUMENTS

JP        7-208595        8/1995

* cited by examiner

Primary Examiner—Tisha Lewis
(74) Attorney, Agent, or Firm—The Webb Law Firm

(57) ABSTRACT

A change-speed system for a utility vehicle includes a gear change-speed device operated for change speed in response to an operation of an actuator, a hydraulic clutch for selectively engaging/disengaging power transmission to the gear change-speed device, a current-controlled valve mechanism for feeding pressure oil to the hydraulic clutch and a hydraulic clutch controlling portion for controlling oil pressure in the hydraulic clutch by controlling a value of electric current to the valve mechanism. The hydraulic clutch controlling portion is operable to initiate a disengaging process of the hydraulic clutch based on initiation of the operation of the actuator and operable also to initiate an engaging process of the hydraulic clutch based on completion of the operation of the actuator. The engaging process of the hydraulic clutch includes a first engaging sub-process for rapidly raising the oil pressure to the hydraulic clutch for a predetermined period and a second engaging sub-process for gradually raising the oil pressure to the hydraulic clutch which has been temporarily dropped subsequent to the first sub-process. There is provided a manual setting device for adjusting the value of the electric current to the valve mechanism from the hydraulic clutch controlling portion in the second engaging sub-process.

6 Claims, 8 Drawing Sheets

FIG.6

(forward)

| speed position of change-speed lever | main change-speed mechanism | | | | auxiliary change-speed mechanism | | forward change-speed mechanism | | speed condition |
|---|---|---|---|---|---|---|---|---|---|
| | 1st | 2nd | 3rd | 4th | LOW | HIGH | LOW | HIGH | |
| 1st position | ○ | | | | ○ | | | ○ | forward 1st speed |
| 2nd position | | ○ | | | ○ | | | ○ | forward 2nd speed |
| 3rd position | | | ○ | | ○ | | ○ | | forward 3rd speed |
| 4th position | | | ○ | ○ | ○ | | | ○ | forward 4th speed |
| 5th position | | | | ○ | ○ | | ○ | | forward 5th speed |
| 6th position | | | | ○ | ○ | | | ○ | forward 6th speed |
| 7th position | ○ | | | | | ○ | ○ | | forward 7th speed |
| 8th position | ○ | | | | | ○ | | ○ | forward 8th speed |
| 9th position | | ○ | ○ | | | ○ | ○ | | forward 9th speed |
| 10th position | | ○ | | | | ○ | | ○ | forward 10th speed |
| 11th position | | | ○ | | | ○ | | ○ | forward 11th speed |
| 12th position | | | | ○ | | ○ | | ○ | forward 12th speed |

FIG.7

(reverse)

| speed position of change-speed lever | main change-speed mechanism | | | | auxiliary change-speed mechanism | | forward change-speed mechanism | | speed condition |
|---|---|---|---|---|---|---|---|---|---|
| | 1st | 2nd | 3rd | 4th | LOW | HIGH | LOW | HIGH | |
| 1st position | ○ | | | | ○ | | — | — | reverse 1st speed |
| 2nd position | | ○ | | | ○ | | — | — | reverse 2nd speed |
| 3rd position | | | ○ | | ○ | | — | — | reverse 3rd speed |
| 4th position | | | ○ | | ○ | | — | — | reverse 4th speed |
| 5th position | | | | ○ | ○ | | — | — | reverse 4th speed |
| 6th position | | | | ○ | ○ | | — | — | |
| 7th position | ○ | | | | | ○ | — | — | reverse 5th speed |
| 8th position | ○ | | | | | ○ | — | — | |
| 9th position | | ○ | | | | ○ | — | — | reverse 6th speed |
| 10th position | | ○ | | | | ○ | — | — | |
| 11th position | | | ○ | | | ○ | — | — | reverse 7th speed |
| 12th position | | | | ○ | | ○ | — | — | reverse 8th speed |

CHANGE-SPEED SYSTEM FOR UTILITY VEHICLE

BACKGROUND OF THE INVENTION

1. Field of the Invention

The present invention relates to a change-speed system for a utility vehicle, the system including a gear change-speed device operated for change speed in response to an operation of an actuator, a hydraulic clutch for selectively engaging/disengaging power transmission to the gear change-speed device, a current-controlled valve mechanism for feeding pressure oil to the hydraulic clutch, and a hydraulic clutch controlling portion for controlling oil pressure in the hydraulic clutch by controlling a value of electric current to the valve mechanism, wherein the hydraulic clutch controlling portion is operable to initiate a disengaging process of the hydraulic clutch based on initiation of the operation of the actuator and operable also to initiate an engaging process of the hydraulic clutch based on completion of the operation of the actuator.

2. Description of the Related Art

With a change-speed system for a utility vehicle of the above-noted type, the hydraulic clutch is temporarily switched over into the disengaged condition in operative association with an operation of the actuator for operating the gear change-speed device for change speed. Hence, this system can eliminate the trouble of manual clutch operation for temporarily breaking the power transmission in the course of a change-speed operation. Also, during a set period from the initiation of the engagement of the hydraulic clutch, the hydraulic clutch controlling portion maintains a predetermined high value for the electric current used for adjusting a valve opening adjustment to be supplied to the valve mechanism, so that with the opening degree being maintained at this large value, the oil pressure of the hydraulic clutch can be raised rapidly. Hence, in comparison with a case when the pressure of the hydraulic clutch is raised gradually and slowly from the initiation of the engaging operation of the hydraulic clutch, the time period required for engagement of the hydraulic clutch can be reduced advantageously. Furthermore, after lapse of the set period described above, the hydraulic clutch controlling portion temporarily drops the current value for the valve opening degree adjustment supplied to the valve mechanism for reducing the valve opening degree of the valve mechanism and then the pressure of the hydraulic clutch will be raised gradually, thereby to restrict occurrence of a shock at the time of clutch engagement.

Further, according to a change-speed system known from the Japanese Patent Application "Kokai" No.: Hei 7-208595, the system allows manual setting of the set period (so-called "initial period") from the initiation of hydraulic clutch engagement for rapidly raising the pressure of the hydraulic clutch. With this construction, by manual setting of the set period, irregularity in the clutch engaging period which may differ from each other for individual hydraulic clutches for instance may be appropriately compensated for.

In the case of a utility vehicle, due to a change in the weight of the vehicle depending on its use condition such as the type of the implement mounted on the vehicle or secular change in the vehicle, there sometimes occurs a deviation of an initial clutch pressure generated in the hydraulic. clutch at the time of its engagement from a predetermined value. And, this deviation in the initial clutch pressure may provide a non-negligible difference between a subsequent actual clutch pressure and the preset clutch pressure immediate after the lapse of the set period. This results in a significant clutch engagement shock. In order to restrict this, it is necessary to adjust the clutch pressure immediately after the lapse of the set period, according to difference in the use condition and/or secular change. And, this adjustment of the clutch pressure too has to be coped with by the manual setting change of the set period.

However, the set period is the period for rapidly raising the pressure of the hydraulic clutch which is under the disengaged condition. With its change, the pressure of the hydraulic clutch immediately after the lapse of the set period too will be changed significantly. And, with such change, it is difficult to effect appropriately change of the set period, with the difference in the use condition and/or secular change, after the lapse of the set period. And, whether the set period is too long or too short, significant clutch engagement will occur. Further, even if the change of the set period can be appropriately effected for a change-speed operation to a certain speed stage, this can increase, rather than decrease, the clutch engagement shock, if the change-speed operation to a different speed is to be effected or if the change-speed operation to the same speed is to be effected, but this requires a different time. For these reasons, it would take considerable trouble and difficulty to make adjustment of change-speed shock according to difference in the use condition or secular change.

SUMMARY OF THE INVENTION

A primary object of the present invention is to facilitate manual adjustment of change-speed shock according to difference in the use condition or secular change.

For accomplishing the above-noted object, according to the present invention, there is provided a change-speed system for a utility vehicle, comprising: a gear change-speed device operated for change speed in response to an operation of an actuator, a hydraulic clutch for selectively engaging/disengaging power transmission to the gear change-speed device, a current-controlled valve mechanism for feeding pressure oil to the hydraulic clutch, and a hydraulic clutch controlling portion for controlling oil pressure in the hydraulic clutch by controlling a value of electric current to the valve mechanism;

wherein the hydraulic clutch controlling portion is operable to initiate a disengaging process of the hydraulic clutch based on initiation of the operation of the actuator and operable also to initiate an engaging process of the hydraulic clutch based on completion of the operation of the actuator;

wherein said engaging process of the hydraulic clutch includes a first engaging sub-process for rapidly raising the oil pressure to the hydraulic clutch for a predetermined period and a second engaging sub-process for gradually raising the oil pressure to the hydraulic clutch which has been temporarily dropped subsequent to said first sub-process; and wherein there is provided a manual setting device for adjusting the value of the electric current to the valve mechanism from the hydraulic clutch controlling portion in said second engaging sub-process.

With this construction, in the second engaging sub-process effected immediately after lapse of the operational period of the first engaging sub-process for rapidly raising the hydraulic clutch oil pressure, the value of current to be supplied to the valve mechanism for adjustment of valve opening degree is for determining a valve opening degree for temporarily decreasing the valve opening degree of the valve mechanism in order to gradually raise the hydraulic clutch pressure after the lapse of the predetermined period. With this adjustment of the electric current by the manual setting device, the pressure to be applied to the hydraulic clutch immediately after the lapse of the first engaging sub-process can be adjusted as desired. As a result, fine adjustment of pressure rise characteristics of the clutch pressure in the second engaging sub-process is made possible.

In the adjustment operation by the manual setting device, if this operation is made for increasing the current value, this will result in reduction in the clutch engaging period, thus increasing the engagement shock. Conversely, if the operation is made for decreasing the current value, this will result in extension in the clutch engaging period, thus decreasing the engagement shock. Hence, the operator can readily recognize change in the engagement shock in association with the adjustment. Further, even if a change speed operation is to be effected to a different target speed or the change speed operation requires a different time, the change in the engagement shock resulting from the adjustment will always have a same tendency. Consequently, even for a change-speed operation to a different target speed or a change-speed operation requiring a different time for its completion, the clutch engagement shock can be restricted effectively.

Therefore, since the above construction allows manual adjustable setting of the current value for valve opening degree adjustment to be supplied to the valve mechanism immediately after the lapse of the first engaging sub-process for rapidly raising the hydraulic clutch oil pressure, with consideration to a difference in the use condition and/or secular change, etc, in the second engaging sub-process, it is possible to realize an appropriate clutch pressure according to difference in the use condition and/or secular change, regardless of difference in the target speed or difference in the period required for the change-speed operation. Thus, it has become possible to facilitate manual adjustment of change-speed shock according to difference in the use condition or secular change.

According to one preferred embodiment of the present invention, said hydraulic clutch controlling portion includes a first engaging sub-process controlling portion for controlling said first engaging sub-process and a second engaging sub-process controlling portion for controlling said second engaging sub-process; and said second engaging sub-process controlling portion includes a reference control characteristics generating portion for generating reference control characteristics for controlling the current value to be supplied to the valve mechanism and an offset amount setting portion for setting an offset amount relative to said reference control characteristics in order to adjust said reference control characteristics, in response to an instruction from said manual setting device. With this construction, the adjustment by the manual setting device involves only an increment or decrement value from the predetermined reference control characteristics. Therefore, the adjustment operation is made easier. And, this adjustment of the increment/decrement value from the reference control characteristics suffices to realize the appropriate clutch pressure according to the use condition difference and/or secular change.

In order to achieve further simplification and convenience in the adjustment operation by the manual setting device, according to a further preferred embodiment of the present invention, said manual setting device is provided as a special setting mode screen generated by an operation on a switch equipped in a control panel unit with a display. With this construction, the operator can effect the adjustment operation while being seated at the driver's seat.

Further and other features and advantages of the invention will become apparent upon reading the following detailed disclosure of the invention with reference to the accompanying drawings.

BRIEF DESCRIPTION OF THE DRAWINGS

FIG. 6 is a chart showing relationship between speed positions of a change-speed lever and forward speed conditions, FIG. 7 is a chart showing relationship between speed positions of the change-speed lever and reverse speed conditions.

DESCRIPTION OF THE PREFERRED EMBODIMENTS

Figure 1:
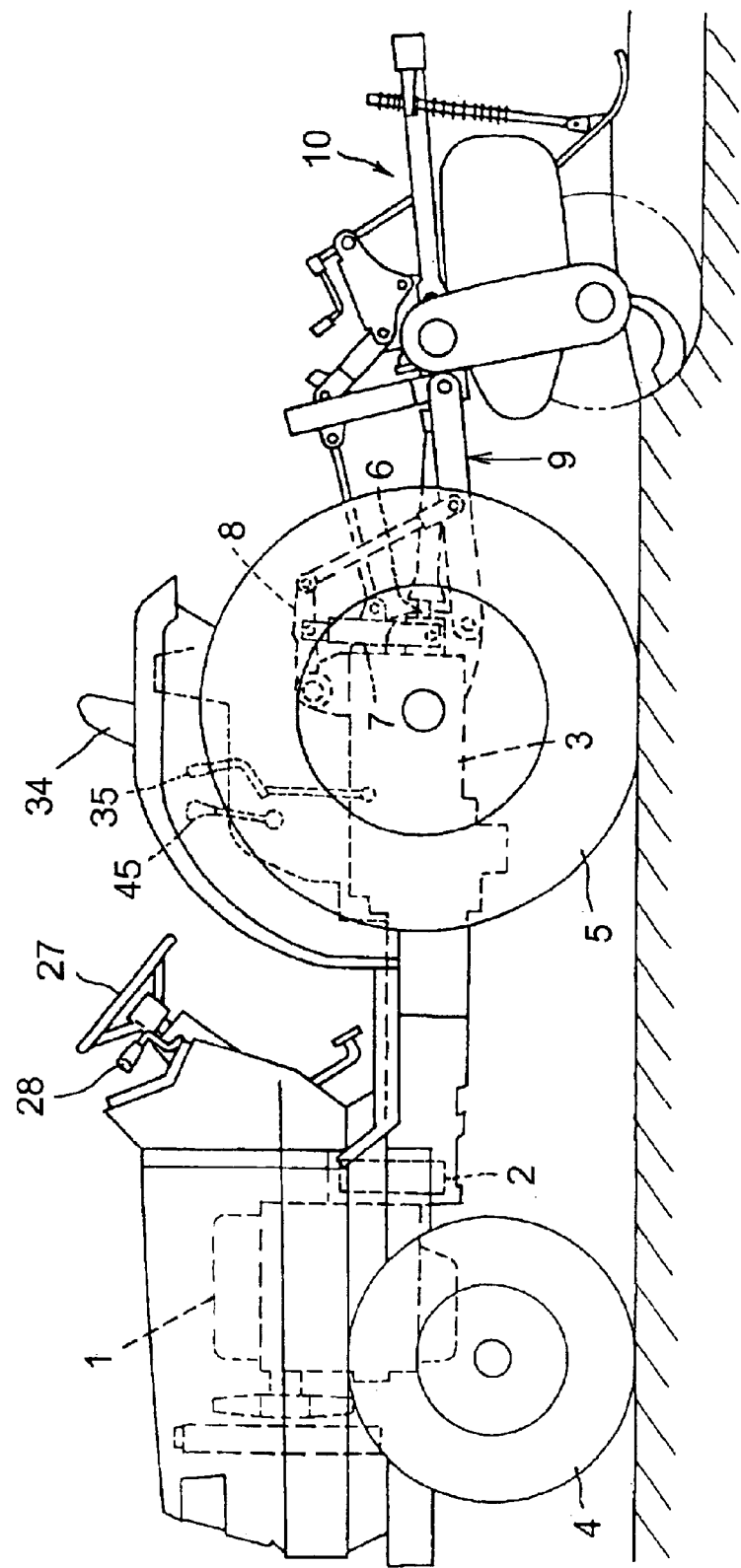
FIG. 1 is an overall side view showing a tractor implementing a change-speed system relating to the present invention.
Figure 2:
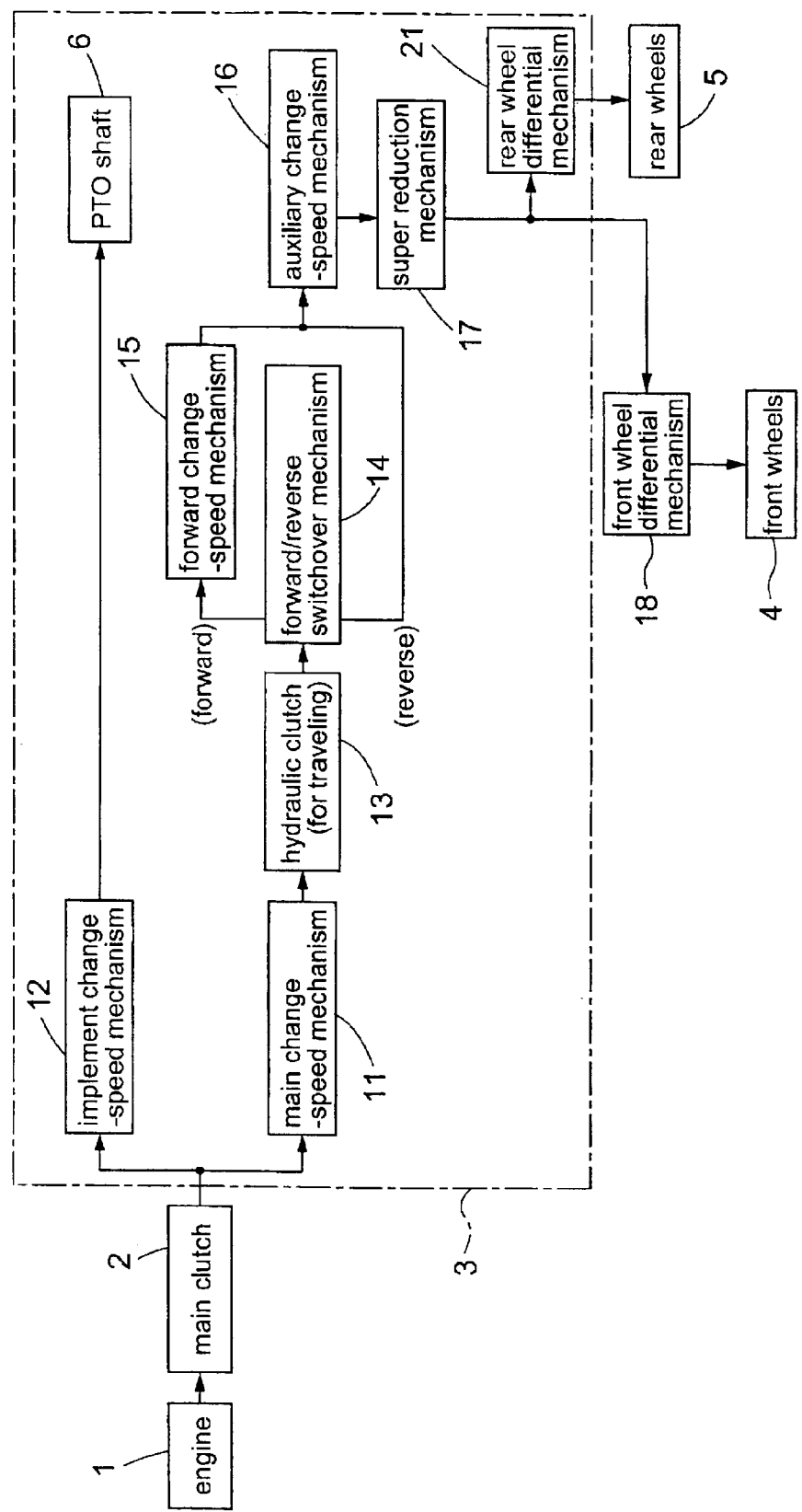
FIG. 2 is a block diagram showing a transmission construction.
Figure 3:
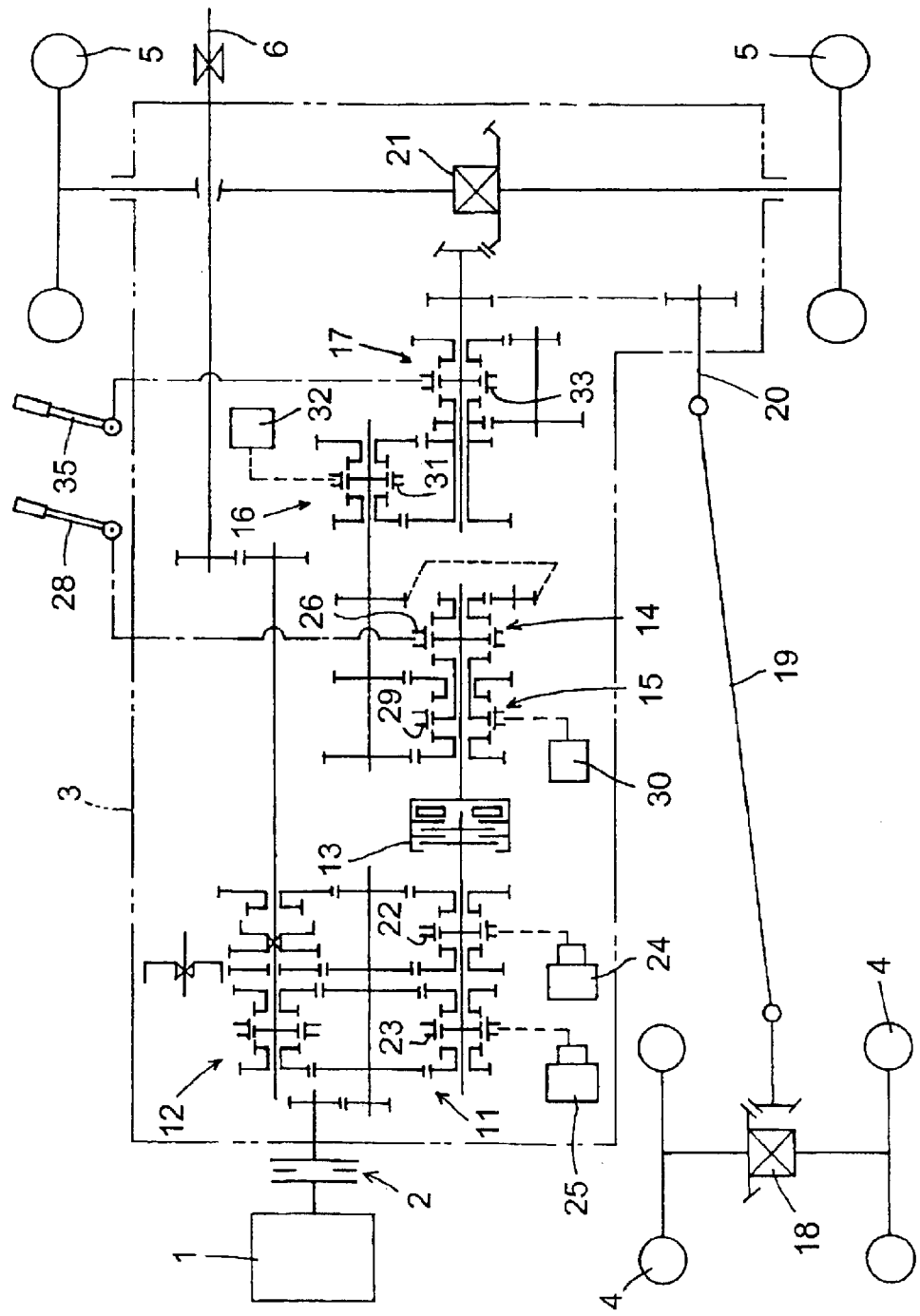
FIG. 3 is a schematic view showing the transmission construction.

FIG. 1 is an overall side view of a tractor as an example of a utility vehicle. FIGS. 2 and 3 show its transmission construction. In this tractor, power from an engine 1 is transmitted via a main clutch 2 to a gear change-speed device 3. Then, the power speed-changed by this gear change-speed device 3 is used as traveling power for driving front wheels 4 and rear wheels 5. The power speed-changed by the gear change-speed device 3 is also used as implement driving power for driving a PTO shaft 6 mounted on the rear portion of the vehicle body.

To the rear of the gear change-speed device 3, there is connected a rotary plow 10 as an example of an implement, with the plow being driven to be lifted up and down via a pair of right and left lift arms 8 pivotable up and down in response to an activation of a hydraulic lift cylinder 7 and a link mechanism 9.

As shown in FIGS. 2 and 3, according to the gear change-speed device 3, the power transmitted via the main clutch 2 is supplied in distribution to a main change-speed mechanism 11 for traveling capable of providing four different speeds and also to a change-speed mechanism 12 for implement capable of providing forward/reverse switchover and two speeds of high and low. The power speed-changed by the main change-speed mechanism 11 is transmitted via a traveling hydraulic clutch 13 to a forward/reverse switchover mechanism 14. The forward traveling power switched over by the forward/reverse switchover mechanism 14 is transmitted via a forward traveling change-speed mechanism 15 capable of providing two high and low speeds by a smaller transmission ratio to an auxiliary change-speed mechanism 16 capable of high and low change-speed operations by a larger transmission ratio. On the other hand, the reverse traveling power switched over by the forward/reverse switchover mechanism 14 is transmitted directly to the auxiliary change-speed mechanism 16, without being transmitted through the forward traveling change-speed mechanism 15. Then, the power speed-changed by this auxiliary change-speed mechanism 16 is transmitted first to a super reduction mechanism 17 for allowing traveling at the creeping speed and then supplied in distribution to an output shaft 20 operably connected to a front wheel differential mechanism 18 via a transmission shaft 19 and also to a rear wheel differential mechanism 21. On the other hand, the power speed-changed by the implement change-speed mechanism 12 is transmitted to the PTO shaft 6.

In operation, the right and left front wheels 4 are driven by the power from the front wheel differential mechanism 18 and the right and left rear wheels 5 are driven by the power from the rear wheel differential mechanism 21. Also, the rotary plow 10 is driven by the power from the PTO shaft 6.

As shown in FIG. 3, the main change-speed mechanism 11 provides (1) a first speed condition when a first shift sleeve 22 disposed on the rear side of the vehicle body is located at a first speed position on the rear side of the vehicle body and a second shift sleeve 23 disposed on the front side of the vehicle body is located at a neutral position, (2) a second speed condition when the first shift sleeve 22 is located at a second speed position on more front side of the vehicle body than the neutral position and the second shift sleeve 23 is located at the neutral position, (3) a third speed condition when the first shift sleeve 22 is located at the neutral position and the second shift sleeve 23 is located at a third speed position on the more rear side of the vehicle body than the neutral position, and (4) a fourth speed condition when the first shift sleeve 22 is located at the neutral position and the second sleeve 23 is located at a fourth speed position on the more front side of the vehicle body than the neutral position. The first shift sleeve 22 is moved in position by a hydraulic first change-speed cylinder 24 acting also as a sequence valve and the second shift sleeve 23 is moved in position by a hydraulic second change-speed cylinder 25 acting as another sequence valve.

The forward/reverse switchover mechanism 14 provides a forward traveling condition when a shift sleeve 26 is located at a forward traveling position on the front side of the vehicle body and a reverse traveling condition when the shift sleeve 26 is located at a reverse traveling position on the rear side of the vehicle body. This shift sleeve 26 is operably coupled with a first switchover lever 28 disposed on the left side of a steering wheel 27.

The forward traveling change-speed mechanism 15 provides a low-speed condition when a shift sleeve 29 is located at a low-speed position on the front side of the vehicle body and a high-speed condition when the shift sleeve 29 is located at a high-speed position on the rear side of the vehicle body. The transmission ratios of these high/low speeds are smaller than the transmission ratios between the respective speeds provided by the main change-speed mechanism 11. Also, the shift sleeve 29 is moved in position by a hydraulic third change-speed cylinder 30 acting also as a still another sequence valve.

The auxiliary change-speed mechanism 16 provides a low-speed condition when a shift sleeve 31 is located at a low-speed position on the front side of the vehicle body and a high-speed condition when the shift lever 31 is located at a high-speed position on the rear side of the vehicle body. The transmission ratios of these high/low speeds are greater than those between the respective speeds provided by the main change-speed mechanism 11. Also, the shift sleeve 31 is moved in position by a hydraulic fourth change-speed cylinder 32 acting also as a yet another sequence valve.

The super reduction mechanism 17 provides a non reduction condition when a shift sleeve 33 is located at a non-reduction position on the front side of the vehicle body and a super-reduction condition when the shift sleeve 33 is located at a super-reduction position on the rear side of the vehicle body. The shift sleeve 33 is moved in position by a second switchover lever 35 disposed on the left rear side of a driver's seat 34.

The first change-speed cylinder 24, the second change-speed cylinder 25, the third change-speed cylinder 30 and the fourth change-speed cylinder 32 function as change-speed shifting actuators.

Figure 4:
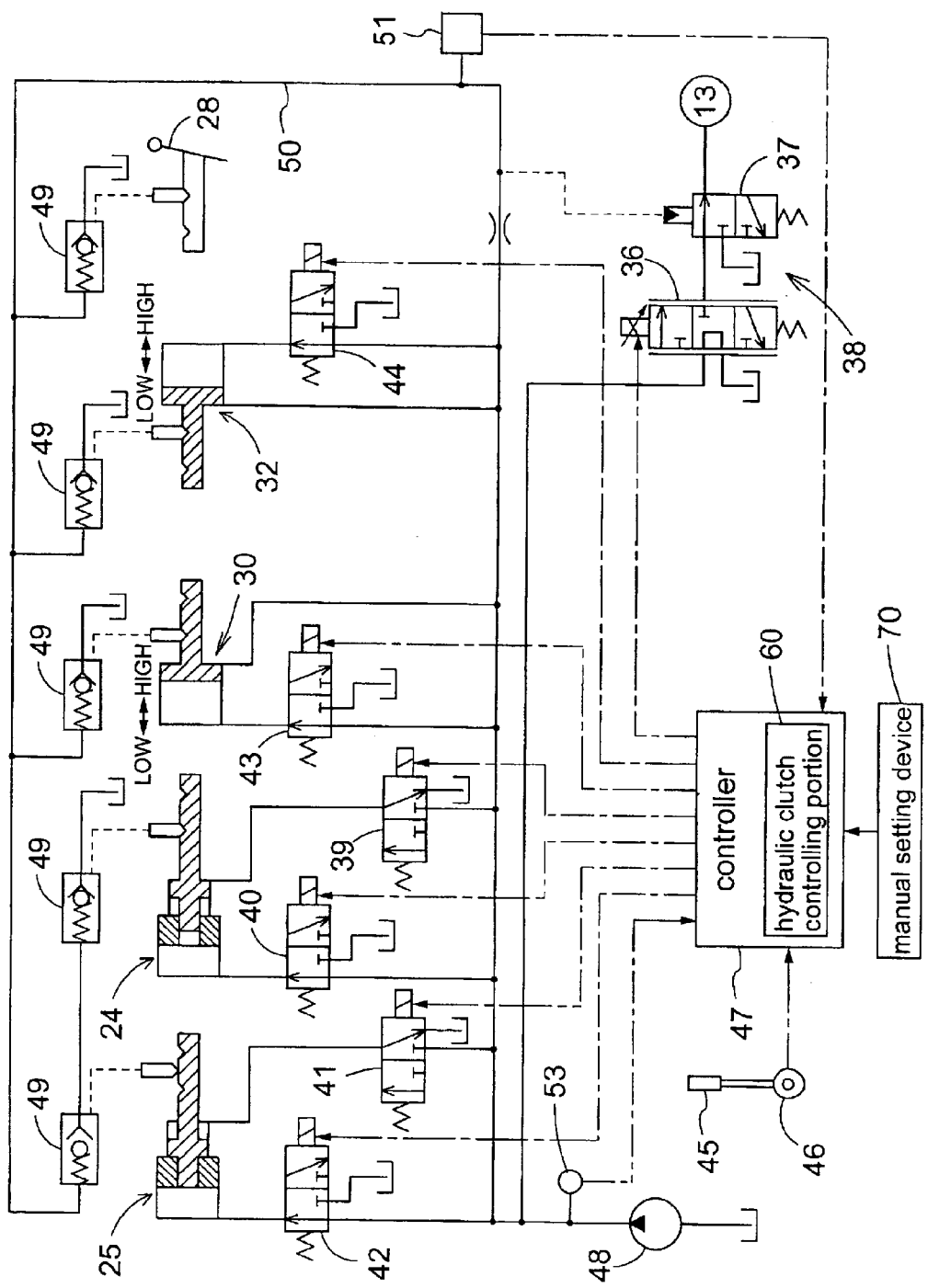
FIG. 4 is a diagram of a hydraulic control circuit of the change-speed system.

As shown in FIG. 4, flow of working oil to the hydraulic clutch 13 is adjusted by a valve mechanism 38 consisting essentially of an electromagnetic proportional valve 36 and a pilot selector valve 37. Flow of the working oil to the first change-speed cylinder 24 is adjusted by a first selector valve 39 and a second selector valve 40 of electromagnetic type. Flow of the working oil to the second change-speed cylinder 25 is adjusted by a third selector valve 41 and a fourth selector valve 42 of electromagnetic type. Flow of the working oil to the third change-speed cylinder 30 is adjusted by a fifth selector valve 43 of electromagnetic type. Flow of the working oil to the fourth change-speed cylinder 32 is adjusted by a sixth selector valve 44 of the electromagnetic type. The electromagnetic control valve 36 and the first through sixth selector valves 39–44 are operated under control of a controller 47 according to an output voltage from a potentiometer 46 which varies according to the speed position of a change-speed lever 45 disposed on the left front side of the driver's seat 34. In particular, the valve mechanism 38 is operated under control of a hydraulic clutch controlling portion 60 comprising hardware and/or software incorporated within the controller 47.

The hydraulic clutch controlling portion 60 is operable to initiate a disengaging process of the hydraulic clutch 13 based on initiation of the operation of the actuators (the first change-speed cylinder 24, the second change-speed cylinder 25, the third change-speed cylinder 30 and the fourth change-speed cylinder 32) and operable also to initiate an engaging process of the hydraulic clutch 13 based on completion of the operation of the actuators. The engaging process of the hydraulic clutch 13 includes a first engaging sub-process for rapidly raising the oil pressure to the hydraulic clutch 13 for a predetermined period and a second engaging sub-process for gradually raising the oil pressure to the hydraulic clutch 13 which has been temporarily dropped subsequent to said first sub-process.

And, there is provided a manual setting device 70 for manually adjusting the value of the electric current to the valve mechanism 38 from the hydraulic clutch controlling portion in said second engaging sub-process. This manual setting device 70 is provided as a special setting mode screen generated by an operation on a switch equipped in a control panel unit with a display disposed on the front side of the driver's seat. In operation, with operation on a predetermined one of switches, the display mode is shifted to the special setting mode. Then, with an operation on a predetermined switch, the adjustment is made possible in total 9 increment and decrement steps.

Figure 5:
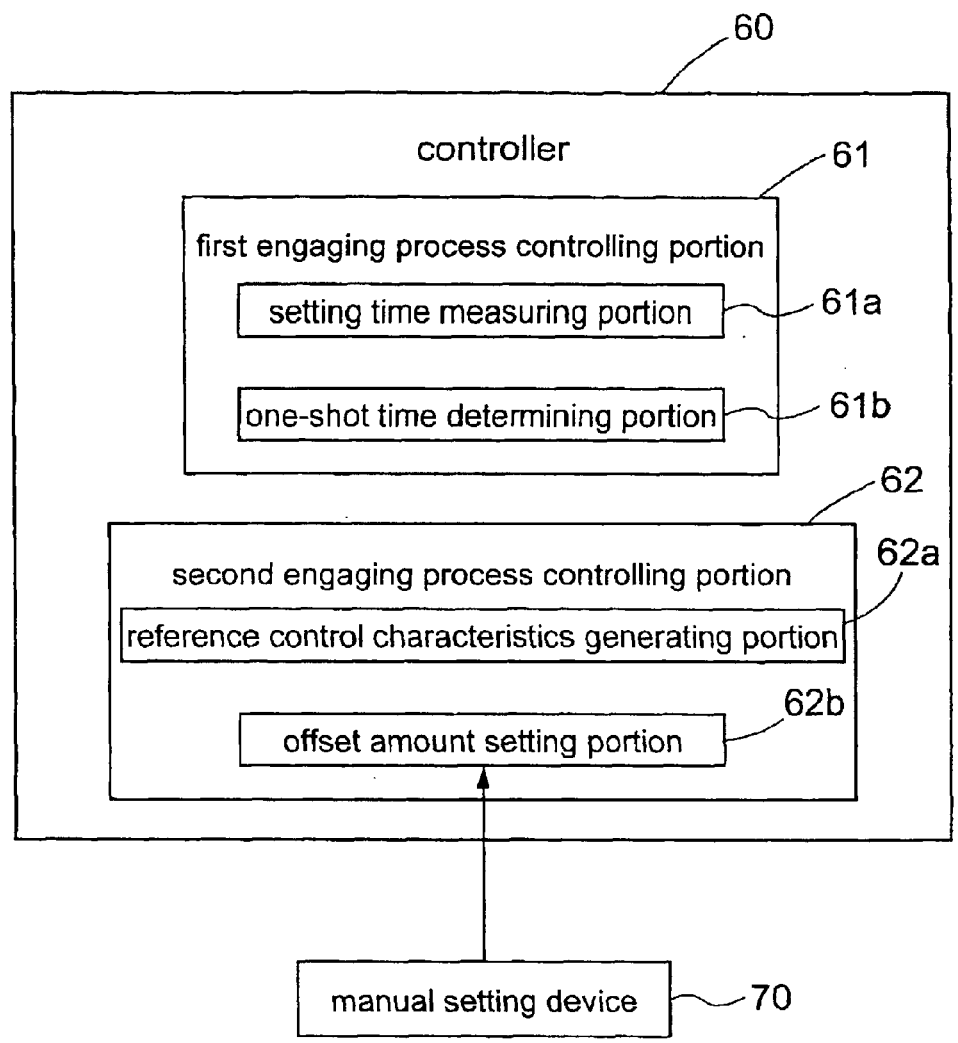
FIG. 5 is a schematic functional block diagram of a hydraulic clutch controlling portion.

As shown in FIG. 5, the hydraulic clutch controlling portion 60 includes a first engaging sub-process controlling portion 61 for controlling said first engaging sub-process and a second engaging sub-process controlling portion 62 for controlling said second engaging sub-process. The first engaging sub-process controlling portion 61 includes a shifting period time measuring portion 61a for measuring a shifting time period from the initiation of the actuator operation to the completion thereof and a one-shot time determining portion 61b for determining execution period of the first engaging sub-process based on the measured shifting time period. The second engaging sub-process controlling portion 62 includes a reference control characteristics generating portion 62a for generating reference control characteristics for controlling the current value to be supplied to the valve mechanism 38 and an offset amount setting portion 62b for setting an offset amount relative to said reference control characteristics in order to adjust said reference control characteristics, in response to an instruction from the manual setting device 70.

With the function of the controller 47 including the above-described hydraulic clutch controlling portion 60, in response to an operation of the change-speed lever 45, the main change-speed mechanism 11, the forward traveling change-speed mechanism 15 and the auxiliary change-speed mechanism 16 are operated for change speeds, thereby to realize the change-speed operations in the 12 steps in the forward and the 8 steps in the reverse.

As shown in FIGS. 6 and 7, when the change-speed lever 45 is operated to the first speed position, there are realized the first speed condition of the main change-speed mechanism 11, the low-speed condition of the auxiliary change-speed mechanism 16 and the high-speed condition of the forward traveling change-speed mechanism 15. When the change-speed lever 45 is operated to the second speed position, there are realized the second speed condition of the main change-speed mechanism 11, the low-speed condition of the auxiliary change-speed mechanism 16 and the high-speed condition of the forward traveling change-speed mechanism 15. When the change-speed lever 45 is operated to the third speed position, there are realized the third speed condition of the main change-speed mechanism 11, the low-speed condition of the auxiliary change-speed mechanism 16 and the low-speed condition of the forward traveling change-speed mechanism 15. When the change-speed lever 45 is operated to the fourth speed position, there are realized the third speed condition of the main change-speed mechanism 11, the low-speed condition of the auxiliary change-speed mechanism 16 and the high-speed condition of the forward traveling change-speed mechanism 15. When the change-speed lever 45 is operated to the fifth speed position, there are realized the fourth speed condition of the main change-speed mechanism 11, the low-speed condition of the auxiliary change-speed mechanism 16 and the low-speed condition of the forward traveling change-speed mechanism 15. When the change-speed lever 45 is operated to the sixth speed position, there are realized the fourth speed condition of the main change-speed mechanism 11, the low-speed condition of the auxiliary change-speed mechanism 16 and high-speed condition of the forward traveling change-speed mechanism 15. When the change-speed lever 45 is operated to the seventh speed position, there are realized the first speed condition of the main change-speed mechanism 11, the high-speed condition of the auxiliary change-speed mechanism 16 and the low-speed condition of the forward traveling change-speed mechanism 15. When the change-speed lever 45 is operated to the eighth speed position, there are realized the first speed condition of the main change-speed mechanism 11, the high-speed condition of the auxiliary change-speed mechanism 16 and the high-speed condition of the forward traveling change-speed mechanism 15. When the change-speed lever 45 is operated to the ninth speed position, there are realized the second speed condition of the main change-speed mechanism 11, the high-speed condition of the auxiliary change-speed mechanism 16 and the low-speed condition of the forward traveling change-speed mechanism 15. When the change-speed lever 45 is operated to the tenth speed position, there are realized the second speed condition of the main change-speed mechanism 11, the high-speed condition of the auxiliary change-speed mechanism 16 and the high-speed condition of the forward traveling change-speed mechanism 15. When the change-speed lever 45 is operated to the eleventh speed position, there are realized the third speed condition of the main change-speed mechanism 11, the high-speed condition of the auxiliary change-speed mechanism 16 and the high-speed condition of the forward traveling change-speed mechanism 15. When the change-speed lever 45 is operated to the twelfth speed position, there are realized the fourth speed condition of the main change-speed mechanism 11 and the high-speed condition of the auxiliary change-speed mechanism 16 and the high-speed condition of the forward traveling change-speed mechanism 15.

And, as described hereinbefore, when the first switchover lever 28 is operated to the forward traveling position to realize the forward traveling condition of the forward/reverse switchover mechanism 14, the forward traveling power from the forward/reverse switchover mechanism 14 is transmitted via the forward traveling change-speed mechanism 15 to the auxiliary change-speed mechanism 16. With this the change-speed condition of the forward traveling change-speed mechanism 15 becomes effective. Hence, as shown in FIG. 6, the 12 steps of the forward traveling speeds are realized in correspondence with the respective 12 steps speeds of the change-speed lever 45. On the other hand, when the first switchover lever 28 is operated to the reverse traveling condition to realize the reverse traveling condition of the forward/reverse switchover mechanism 14 the reverse traveling power from the forward/reverse switchover mechanism 14 is directly transmitted to the auxiliary change-speed mechanism 16, not via the forward traveling change-speed mechanism 15. With this, the change-speed condition of the forward traveling change-speed mechanism 15 becomes ineffective. So, as shown in FIG. 7 the 8 steps of the reverse traveling speeds are realized in correspondence with the respective 8 steps speeds of the change-speed lever 45.

Incidentally, in the reverse traveling, the first speed position of the change-speed lever 45 provides the reverse first speed position, the second speed position of the change-speed lever 45 provides the reverse second speed position, the third speed position and the fourth speed position of the change-speed lever 45 provide the reverse third speed position, the fifth speed position and the sixth speed position of the change-speed lever 45 provide the reverse fourth speed position, the seventh speed position and the eighth speed position of the change-speed lever 45 provide the reverse fifth speed position, the ninth speed position and the tenth speed position of the change-speed lever 45 provide the reverse sixth speed position, the eleventh speed position of the change-speed lever 45 provides the reverse seventh speed position, and the twelfth speed position of the change-speed lever 45 provides the reverse eighth speed position, respectively.

Next, change-speed operations with operations of the change-speed lever 45 will be described. For instance, FIG. 4 shows the forward first speed condition realizing the first speed condition of the main change-speed mechanism 11, the low-speed condition of the auxiliary change-speed mechanism 15 and the high-speed condition of the forward traveling change-speed mechanism 15. In this, the hydraulic clutch 13 is engaged with the working oil from the pump 48. From this condition, if the change-speed lever 45 is moved from the first speed position to the second speed position, under the control of the hydraulic clutch controlling portion 60 associated with this operation, the first selector valve 39 is switched over to a condition for feeding the oil to the first change-speed cylinder 24 and the second selector valve 40 is switched over to a condition for discharging the oil from the first change-speed cylinder 24, whereby contraction operation of the first change-speed cylinder 24 is initiated.

With this initiation of the contraction operation of the first change-speed cylinder 24, in association therewith, a corresponding check valve 49 is mechanically opened to cause a pressure drop in an oil passage 50. Then, the selector valve 37 using the pressure of this oil passage 50 as the pilot pressure is switched over to a condition for discharging the oil from the hydraulic clutch 13, whereby the hydraulic clutch 13 is disengaged. With this, the displacing operation of the first shift sleeve 22 by the first change-speed cylinder 24 may be effected smoothly.

When the first shift sleeve 22 is displaced to the predetermined speed position by the contraction operation of the first change-speed cylinder 24, a check valve 49 corresponding to the first change-speed cylinder 24 is mechanically closed, thereto raise the pressure in the oil passage 50, whereby the hydraulic clutch 13 is switched over to the engaged condition. With this engagement of the hydraulic clutch 13, the power transmission under the forward second speed condition or the reverse second speed condition with switchover of the main change-speed mechanism 11 from the first speed condition to the second speed condition is initiated. In this, based on detection information for a pressure sensor 51 for detecting the pressure in the oil passage 50, the hydraulic clutch controlling portion 60 executes the first engaging sub-process for rapidly raising the pressure of the hydraulic clutch 13 for the predetermined period (t) from the initiation of the engagement of the hydraulic clutch 13 and then, after the lapse of the predetermined period (t), executes the second engaging sub-process for gradually raising the pressure of the hydraulic clutch 13 which pressure has once been dropped. In either case, the hydraulic clutch controlling portion 60 is configured to control the electric current value for valve opening degree adjustment to be supplied to the electromagnetic proportional valve 36. The conditions of the current values to be supplied to the electromagnetic proportional valve 36 in the first engaging sub-process and the second engaging sub-process of the hydraulic clutch controlling portion 60 are illustrated in FIG. 8.

Figure 8:
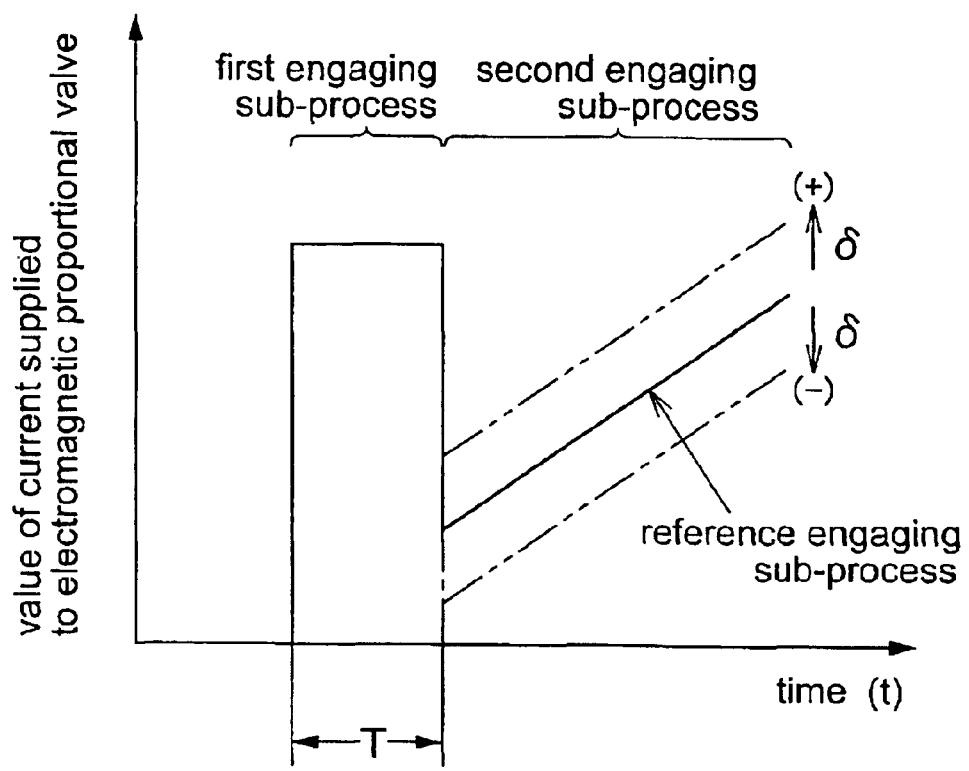
FIG. 8 is a graph showing pressure rise characteristics illustrating change in an electric current value supplied to an electromagnetic proportional value in response to an adjustment operation using a manual setting device.

Incidentally, in this FIG. 8, the solid line in the second engaging sub-process represents the reference control characteristics. And, the offset amounts relative to the current values according to this reference control characteristics are denoted with alternate long and short dash lines. As will be described later herein, this reference control characteristics are determined by the reference control characteristics generating portion 62a and the offset amounts relative thereto are determined by the offset amount setting portion 62b.

The reference control characteristics of the reference control characteristics generating portion 62a may be obtained as functions of various control elements (e.g. change in an acceleration (referred to also as "jerk")) detected on each occasion. This technique is described in e.g. the U.S. Pat. No. 6,112,870 assigned to the present applicant. Alternatively, reference control characteristics prepared in the form of a table may be employed.

With the engaging process for the hydraulic clutch 13 consisting of the first engaging sub-process and the second engaging sub-process, the time period required for engagement of the hydraulic clutch 13 in the course of a change-speed operation may be reduced and at the same time occurrence of clutch engagement shock may be restricted.

Though not described in details, the other change-speed operations can be effected basically the same as above. Namely, while the displacing operations of the corresponding shift sleeves 22 23, 29, 31 are being effected, the hydraulic clutch 13 is disengaged. Then, when the corresponding shift sleeves 22, 23, 29, 31 have been displaced to the predetermined respective speed positions, the hydraulic clutch 13 is engaged by the above-described predetermined process.

In the case of the change-speed operation construction described above, because of the nature of this construction per se, the change-speed operation period will vary, depending on the kinds of the change-speed cylinders 24, 25, 30, 32 and the number thereof employed. And, the longer the change-speed operation period, the greater the amount of oil discharged from the hydraulic clutch 13, hence, the greater the amount of oil initially required for the engaging operation of the hydraulic clutch 13. On the other hand, as for the working oil, the lower its temperature, the higher its viscosity, hence, the lower its fluidity.

For this reason, the hydraulic clutch controlling unit 60, based on the detection information from the pressure sensor 51, detects the initiation of the operations of the change-speed cylinders 24, 25, 30, 32 corresponding to each change-speed operation and causes a shifting period measuring portion 52 to initiate its measurement, then detects stops of the operations of the change-speed cylinders 24, 25, 30 32 corresponding to that change-speed operation and causes the shifting period measuring portion 52 to terminate the measurement, thereby to determine the change-speed operation which was required for that change-speed operation. Then, from this change-speed operation period, the one-shot time determining portion 61b determines by calculation a set period: t (referred to as "one-shot time") for obtaining the amount of oil required for the initial stage of the engagement operation of the hydraulic clutch 13. In this, it is preferred that this one-shot time: t be adjusted based on a detected temperature from an oil temperature meter 53 for detecting the temperature of the work oil.

With the above-described arrangement, regardless of any variation in the change-speed operation period due to a difference in the speed position or variation in the viscosity of the working oil due to its temperature, the time period required for engagement of the hydraulic clutch 13 in the course of a change-speed operation may be reduced and at the same time occurrence of clutch engagement shock may be restricted.

Incidentally, when the predetermined period required for discharging all work oil from the hydraulic clutch 13 has elapsed, the hydraulic clutch controlling portion 60 is configured to stop the measurement by the shifting time measuring portion 52 and also to change the one-shot time (t) to a length to be applied for a change-speed operation for starting the vehicle for obtaining the oil amount required for the initial stage of the engagement operation of the hydraulic clutch 13 from which the working oil has been completely discharged. Moreover, the hydraulic clutch controlling portion 60 is configured also to determine, based on detection information from a potentiometer 46, whether the present change-speed operation is for starting the vehicle or a change-speed operation during traveling of the vehicle.

Incidentally, in the case of utility vehicles such as a tractor, due to change in the vehicle body weight resulting from a particular use condition such as the type of implement mounted on the vehicle or from secular change, there may occur a change in the clutch pressure for initiating the drive of the front and rear wheels 4, 5 (meaning realization of power transmission from the engine to the wheels) at the time of engagement of the hydraulic clutch 13. Then, in accordance with a difference between such clutch pressure and the expected clutch pressure immediately after the lapse of the one-shot time, there will occur a significant clutch engagement shock. For this reason, it is necessary to adjust the clutch pressure immediately after the lapse of the one-shot time (t) in accordance with a difference in the use condition and/or secular change.

Then, in this tractor, as shown in FIG. 8, the construction allows manual setting change by the manual setting device 70 for the electric current value for valve opening degree adjustment from the second engaging sub-process controlling portion 62 of the hydraulic clutch controlling portion 60 to the electromagnetic proportional control valve 36 immediately after the lapse of the one-shot time (t). With this setting change, the clutch pressure immediately after the lapse of the one-shot time (t) can be adjusted. Further, with this setting change, the current value for the valve opening degree adjustment to be supplied from the hydraulic clutch controlling portion 60 to the electromagnetic control valve 36 after the lapse of the one-shot time (t) is offset.

The reference control characteristics for determining the electric current value for valve opening degree adjustment supplied to the electromagnetic proportional valve 36 as the second engaging-sub process immediately after the lapse of the one-shot time (t) includes an electric current value for determining a valve opening degree for temporarily reducing the opening degree of the electromagnetic proportional valve 36 for the subsequent gradual rise of the pressure of the hydraulic clutch 13. And, a change of this reference control characteristics will bring about a change in the oil pressure applied to the hydraulic clutch 13 immediately after the lapse of the one-shop time (t). More particularly, by changing the line of the reference control characteristics shown in FIG. 8 by a predetermined offset amount δ by operation of the manual setting device 70, fine adjustment of the clutch pressure immediately after the lapse of the one-shot time (t) is possible.

In the above, if this operation is made for increasing the current value, this will result in reduction in the clutch engaging period, thus increasing the engagement shock. Conversely, if the operation is made for decreasing the current value, this will result in extension in the clutch engaging period, thus decreasing the engagement shock. Hence, the operator can readily recognize change in the engagement shock in association with the adjustment. Further, even if a change speed operation is to be effected to a different target speed or the change speed operation requires a different time, the change in the engagement shock resulting from the adjustment will always have a same tendency. Consequently, even for a change-speed operation to a different target speed or a change-speed operation requiring a different time for its completion, the clutch engagement shock can be restricted effectively.

That is to say, since the above construction allows manual adjustable setting of the current value for valve opening degree adjustment to be supplied to the valve mechanism immediately after the lapse of the one-shot time (t) for rapidly raising the oil pressure of the hydraulic clutch 13, with consideration to a difference in the use condition and/or secular change, etc, immediately after the lapse of the one-shot time (t), it is possible to realize an appropriate clutch pressure according to difference in the use condition and/or secular change, regardless of difference in the target speed or difference in the period required for the change-speed operation. Thus, it has become possible to restrict occurrence of clutch engagement shock, thus facilitating manual adjustment of change-speed shock according to difference in the use condition or secular change.

For instance, with change of the implement to be mounted, the vehicle body will become heavier, thus inviting delay in the drive of the front and rear wheels 4, 5 (meaning realization of power transmission from the engine to the wheels). In such case, depending on the amount or degree of the delay, the current value for the valve opening degree adjustment to be supplied from the hydraulic clutch controlling portion 60 to the electromagnetic proportional valve 36 immediately after the lapse of the one-shot time (t) will be incremented. Conversely, if reduction in the vehicle weight causes the drive of the front and rear wheels 4, 5 to take place earlier, depending on the amount or degree thereof, the current value for valve opening degree adjustment to be supplied from the hydraulic clutch controlling portion 60 to the electromagnetic proportional valve 36 immediately after the lapse of the one-shot time (t) will be decremented. With these, it is possible to restrict occurrence of change-speed engagement shock due to difference in the use condition.

Incidentally, the offset amount setting portion 62b is configured such that setting change by the current value for valve opening degree adjustment to be supplied from the hydraulic clutch controlling portion 60 to the electromagnetic proportional valve 36 immediately after the lapse of the one-shot time (t) will change the current value immediately after the lapse of the set period (t) and/or the current value to be supplied thereafter.

Also, the invention is not limited to the construction shown in FIG. 8 in which the offset amount δ is incremented or decremented by a fixed value relative to the reference control characteristics. Instead, the invention may employ a different control scheme according to which the offset amount δ is determined by a time factor δ (t) which varies with a lapsed time T.

Further, it will also be convenient if the manual setting change of the current value for valve opening degree adjustment to be supplied from the hydraulic clutch controlling portion 60 to the electromagnetic proportional valve 36 immediately after the lapse of the one-shot time (t), i.e. the adjustment of the offset amount δ is effected in a stepless manner.

The change-speed system according to the present invention may be applied to any other type of utility vehicle than the tractor.

The invention may be embodied in any other way than disclosed in the above detailed description without departing from the essential spirit thereof defined in the appended claims. All modifications apparent for those skilled in the art are intended to be encompassed within the scope of the invention defined by the claims.

What is claimed is:

1. A change-speed system for a utility vehicle, comprising:
a gear change-speed device operated for change speed in response to an operation of an actuator;
a hydraulic clutch for selectively engaging/disengaging power transmission to the gear change-speed device;
a current-controlled valve mechanism for feeding pressure oil to the hydraulic clutch; and
a hydraulic clutch controlling portion for controlling oil pressure in the hydraulic clutch by controlling a value of electric current to the valve mechanism;
wherein the hydraulic clutch controlling portion is operable to initiate a disengaging process of the hydraulic clutch based on initiation of the operation of the actuator and operable also to initiate an engaging process of the hydraulic clutch based on completion of the operation of the actuator;
wherein said engaging process of the hydraulic clutch includes a first engaging sub-process for rapidly raising the oil pressure to the hydraulic clutch for a predetermined period and a second engaging sub-process for gradually raising the oil pressure to the hydraulic clutch which has been temporarily dropped subsequent to said first sub-process; and
wherein there is provided a manual setting device for adjusting the value of the electric current to the valve mechanism from the hydraulic clutch controlling portion in said second engaging sub-process.

2. The change-speed system according to claim 1, wherein said hydraulic clutch controlling portion includes a first engaging sub-process controlling portion for controlling said first engaging sub-process and a second engaging sub-process controlling portion for controlling said second engaging sub-process; and
said second engaging sub-process controlling portion includes a reference control characteristics generating portion for generating reference control characteristics for controlling the current value to be supplied to the valve mechanism and an offset amount setting portion for setting an offset amount relative to said reference control characteristics in order to adjust said reference control characteristics, in response to an instruction from said manual setting device.

3. The change-speed system according to claim 2, wherein said offset amount remains constant in said second engaging sub-process.

4. The change-speed system according to claim 2, wherein said offset amount is a time factor value which varies over time in said second engaging sub-process.

5. The change-speed system according to claim 1, wherein said manual setting device is provided as a special setting mode screen generated by an operation on a switch equipped in a control panel unit with a display.

6. The change-speed system according to claim 2, wherein said first engaging sub-process controlling portion includes a shifting time measuring portion for measuring a shifting time period from the initiation of the operation of the actuator to completion thereof and a one-shot time determining portion for determining execution time period for the first engaging sub-process based on said shifting time period.

* * * * *